United States Patent [19]

Rademaker

[11] Patent Number: 4,504,974
[45] Date of Patent: Mar. 12, 1985

[54] OPTO-ELECTRONIC REPEATER

[75] Inventor: Gerrit Rademaker, Hilversum, Netherlands

[73] Assignee: U.S. Philips Corporation, New York, N.Y.

[21] Appl. No.: 537,554

[22] Filed: Oct. 3, 1983

Related U.S. Application Data

[63] Continuation of Ser. No. 155,915, Jun. 3, 1980, abandoned.

[30] Foreign Application Priority Data

Jun. 6, 1979 [NL] Netherlands ............ 7904413

[51] Int. Cl.³ .............................. H04B 9/00
[52] U.S. Cl. ....................... 455/601; 250/551;
307/311; 455/602; 455/603; 455/608; 455/613;
455/618
[58] Field of Search ............ 455/601, 602, 603, 606,
455/608, 613, 618; 307/311; 250/551;
179/175.31 R

[56] References Cited

U.S. PATENT DOCUMENTS

| | | | |
|---|---|---|---|
| 3,187,260 | 6/1965 | Dove | 375/37 |
| 3,534,351 | 10/1970 | Harnden, Jr. et al. | 455/603 |
| 3,808,366 | 4/1974 | Wanamaker et al. | 455/602 |
| 3,869,641 | 3/1975 | Goldberg | 307/311 |
| 3,943,367 | 3/1976 | Baker | 250/551 |
| 3,999,087 | 12/1976 | Compton | 307/311 |
| 4,054,834 | 10/1977 | Boirat et al. | 455/602 |
| 4,158,144 | 6/1979 | Krause | 250/551 |
| 4,270,029 | 5/1981 | Sato et al. | 179/175.31 R |

FOREIGN PATENT DOCUMENTS 52-72502  6/1977  Japan ..................... 455/608

OTHER PUBLICATIONS

Haynes et al., Circuit for Generating an Optical Carrier with PSK Subcarrier Modulation-RCA TN No. 611, Mar. 1965.
Riddle-Bright Future for Opto-Electronics-Electronic Engineering, Sep. 1973, vol. 45, No. 547, pp. 89-92.

Primary Examiner—Joseph A. Orsino, Jr.
Attorney, Agent, or Firm—Thomas A. Briody; William J. Streeter

[57] ABSTRACT

An opto-electronic repeater provides by means of a differentiation circuit and a trigger circuit a considerable extension of the life of the radiation-emitting element by reducing the duty cycle of the control signal for the radiation-emitting element.

2 Claims, 5 Drawing Figures

OPTO-ELECTRONIC REPEATER

CROSS REFERENCE TO OTHER APPLICATIONS

This application is a continuation of application Ser. No. 155,915, filed June 3, 1980 now abandoned.

The invention relates to a repeater comprising a radiation-emitting element and a radiation-sensitive element for generating command signals from binary information signals electrically isolated therefrom.

BACKGROUND OF THE INVENTION

Such a repeater is generally known and is inter alia used in telegraphy and data systems. Opto-electronic repeaters in professional equipment have the drawback that the radiation-emitting element (for example a light-emitting diode, LED) is subject to rapid ageing.

It is an object of the invention to provide a repeater as defined in the opening paragraph, in which the life of the radiation-emitting element is prolonged. The invention accomplishes this object as it is characterized in that the repeater comprises first means coupled to the radiation-emitting element for generating first control signals for the radiation-emitting element from the information signals, these control signals having a shorter duty-cycle than the information signals and that second control signals are generated from the first control signals electrically isolated therefrom. Duty cycle of the control signal is here understood to mean the ratio between the period of time in which the control signal has such a value that the radiation-emitting element emits radiation and the period of the control signal.

By means of the invention the operating time of the radiation-emitting is shortened, thus ensuring a longer life of this element.

SUMMARY OF THE INVENTION

The invention may be implemented so that the first means comprise a differentiator. This has the advantage that the radiation-emitting element is controlled by means of short, but relatively high current pulses, so that on the one hand the average current remains low which ensures a long life and on the other hand the transmission speed is high, so that high bit rates are realisable when used in telegraphy and data systems.

The current pulses with which the radiation-emitting element is controlled result in current pulses in the radiation sensitive element. In order to generate, if so desired, a binary data signal from this signal it is advantageous for the repeater to comprise second means coupled to the radiation-sensitive element for generating command signals from the second control signals.

BRIEF DESCRIPTION OF THE DRAWINGS

Examples of the invention will be described in more detail with reference to the accompanying drawings, in which.

Corresponding elements in the different embodiments have been given the same reference symbols.

DESCRIPTION OF THE PREFERRED EMBODIMENTS

Figures 1, 3:
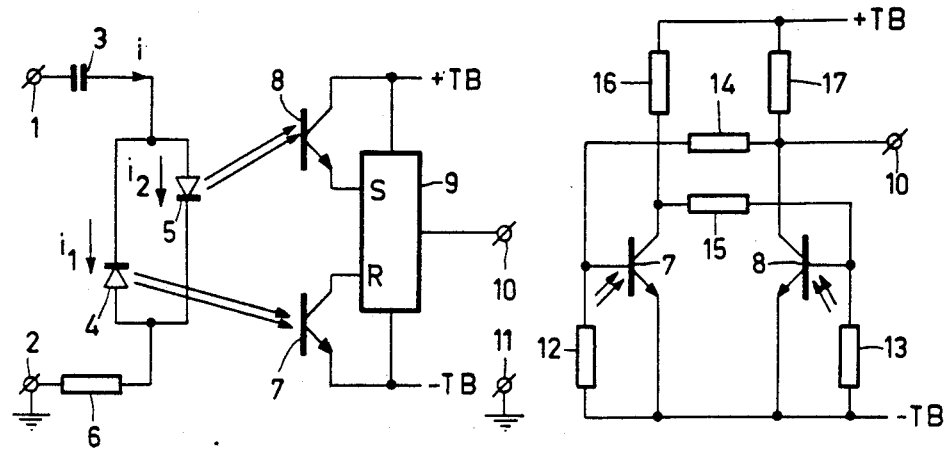
FIG. 1 shows a first embodiment of an optoelectronic repeater according to the invention.
FIG. 3 shows a portion of a second embodiment of an opto-electronic repeater according to the invention.
Figure 2:
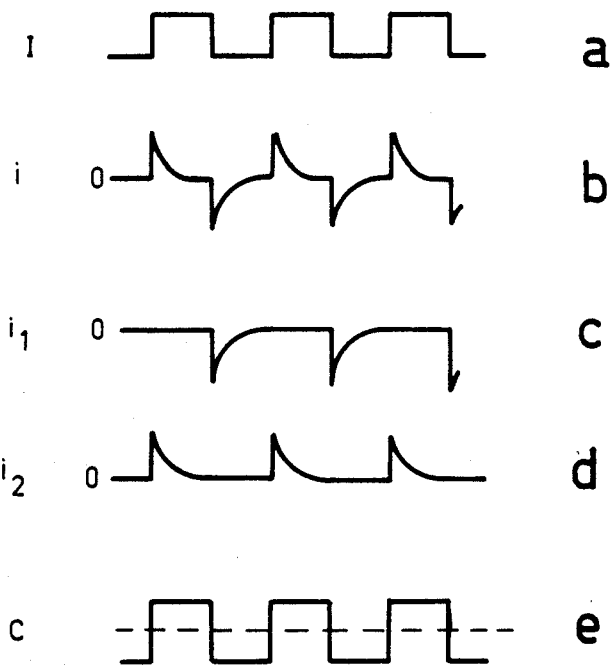
FIG. 2 (a–e) shows some waveforms to explain the opto-electronic repeater of FIG. 1.

The opto-electronic repeater shown in FIG. 1 comprises a first input terminal 1 to which information signals I are applied which have, for example, the form shown in FIG. 2a. A second input terminal 2 is connected to a point of fixed potential, for example ground potential. A series arrangement of a capacitor 3, a parallel arrangement of a first radition-emitting element 4, for example a light-emitting diode, and an oppositely poled second radiation-emitting element 5, for example a light-emitting diode, and a resistor 6 is connected between the input terminals 1 and 2. The RC-circuit operates as a differentiator causing first control signals to be generated which show a pulse character at a level transition in the information signal. In this embodiment the first control signals are the current i the form of which is shown in FIG. 2b.

A current $i_1$ consisting of negative pulses flows to the first light-emitting diode 4 and a current $i_2$ consisting of positive pulses flows to the second light-emitting diode 5. FIG. 2c shows the current $i_1$, FIG. 2d shows the current $i_2$. The voltage across diodes 4 and 5 must exceed the voltage necessary to ignite the diodes.

The duty cycle of the first control signals is shorter than the duty cycle of the information signals I which considerably shortens the operating time of the diodes 4 and 5 and the life of each diode increases correspondingly.

A first photo transistor 7 is associated with the first light-emitting diode 4 and a second photo transistor 8 is associated with the second light-emitting diode 5. The emitter of the first transistor 7 is connected to the negative terminal −TB of a battery and the collector circuit 9. The collector of the second photo transistor 8 is connected to the positive terminal +TB of a battery and the emitter is connected to a set input S of the trigger circuit 9. An output of the trigger circuit 9 is connected to the first output terminal 10 of the repeater. The second output terminal 11 is connected to a point having a fixed potential, for example ground potential. When, in response to the current $i_2$, diode 5 ignites, the emitted radiation renders photo transistor 8 conductive, causing the trigger circuit to be set via input S and a signal having a predetermined first level to be produced at the output 10. If a short period of time later the current $i_2$ through the diode 5 has decreased to such an extent that the diode 5 extinguishes, transistor 8 will be rendered non-conductive, but the trigger circuit 9 nevertheless remains in the set state. When, in response to the current $i_1$, diode 4 ignites, the emitted radiation renders photo-transistor 7 conductive, causing the trigger circuit 9 to be reset via input R and a signal having a predetermined second level to be produced at the output 10. The signal at the output to is the command signal C which is shown in FIG. 2e.

The currents flowing in the photo transistors 7 and 8 constitute the second control signals from which, for example in the manner described, binary command signals are derived. However, this is not essential: in some applications the second control signals as such will have a form which is suitable for the purpose of command signals.

FIG. 3 shows a portion of a second embodiment of an opto-electronic repeater wherein the two photo transistors 7 and 8—with which the second control signals are generated—also form part of a bistable trigger circuit. To this end the photo transistors 7 and 8 are provided with a base connection. The base of transistor 7 is connected to −TB via a resistor 12 and to the collector of transistor 8 via a resistor 14. The base of transistor 8 is connected to −TB via a resistor 13 and to the collector of transistor 7 via a resistor 15. The collector of transistors 7 and 8, respectively, is connected to +TB via resistors 16 and 17, respectively. The bistable trigger circuit with photo transistors operates as follows, in a manner which is known per se. Let it be assumed that transistor 7 is non-conducting and transistor 8 conducts. The output signal which is obtained at output terminal 10, which is connected to the collector of transistor 8, then has a first, low value. If now transistor 7 is rendered conductive by a light-emitting diode, the collector voltage of transistor 7 decreases, in response to which the base voltage of transistor 8 also decreases (via resistor 15), in response to which the collector voltage of transistor 8 increases. Also when transistor 7 does not receive any further radiation, transistor 7 remains conductive, as the higher collector voltage of transistor 8 is transferred to the base of transistor 7 via resistor 14. The output voltage—the collector voltage of transistor 8—has a second, high value. Switching the bistable trigger circuit back to the original output condition by a pulse of radiation incident on the transistor 8 occurs in a fully corresponding manner, as the circuit is symmetrical.

Figure 4:
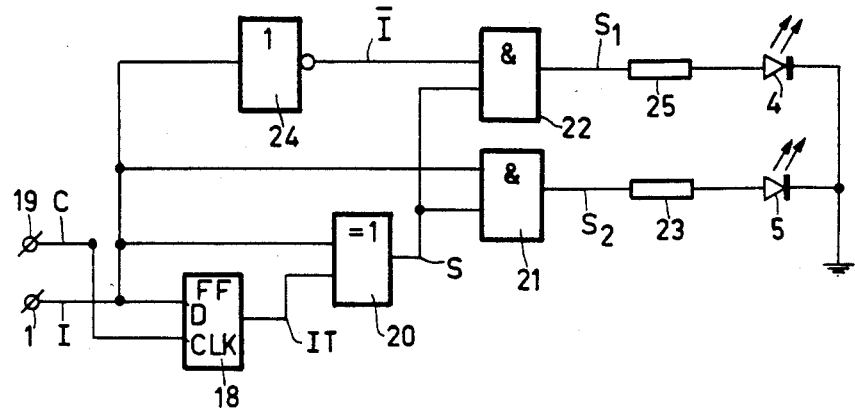
FIG. 4 shows a portion of a third embodiment of an opto-electronic repeater according to the invention.
Figure 5:
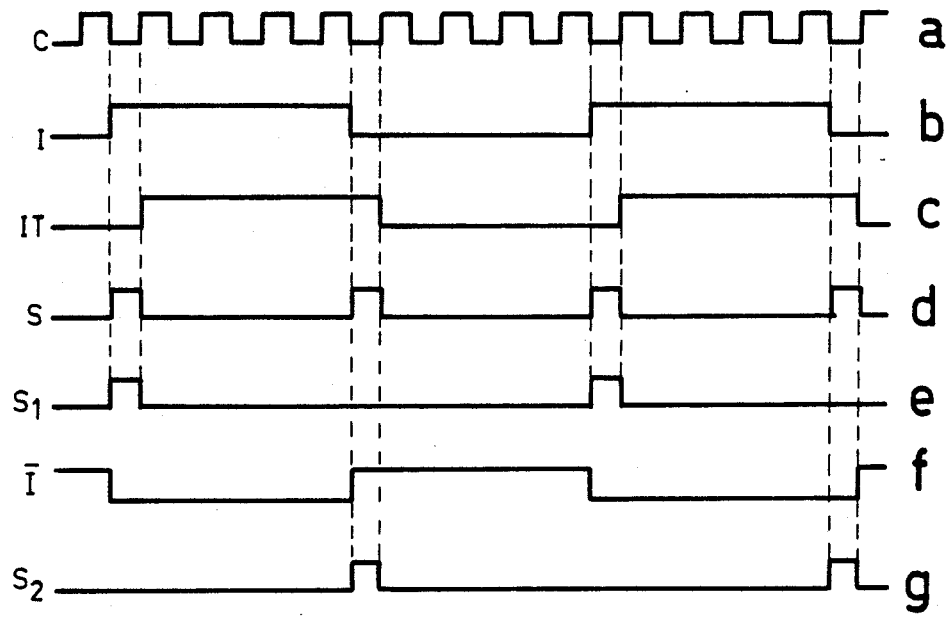
FIG. 5 shows some waveforms to explain the opto-electronic repeater shown in FIG. 4.

FIG. 4 shows a portion of a third embodiment of a repeater, wherein the reduction of the duty cycle is effected in digital manner. FIG. 5 shows some waveforms to explain the operation of FIG. 4. Input terminal 1 is connected to a D-input of a D-type trigger circuit 18 for applying a clock-synchronous information signal I having a form as shown, for example, in FIG. 5b. A clock signal C which is generated in a manner which is known per se—for example from the information signal—with a frequency which is higher than the frequency of the information signal I is applied to input terminal 19. A clock input CLK of trigger circuit 18 is connected to input terminal 19. An information signal IT which is shifted over half a period of the clock signal C is available at the output of the trigger circuit (FIG. 5c). The signal IT and also the information signal I are applied to inputs of an exclusive OR-gate 20. The output signal S of the exclusive OR-gate 20 is applied to an input of a first AND-gate 21 and to an input of a second AND-gate 22. The information signal I is applied to a further input of the first AND-gate 21, a signal $S_2$ which is illustrated in FIG. 5g is obtained at the output of the first AND-gate 21. The signal $S_2$ is the control signal which is applied to diode 5 via a resistor 23 for generating a portion of the first control signal. The first control signal has a smaller duty cycle than the information signal, so that the life of the diode is extended Information signal I (FIG. 5f), inverted by a invertor 24 is applied to a further input of the second AND-gate 22. A signal $S_1$ (FIG. 5e) is available at the output of the second AND-gate 22. The signal $S_1$ is the control signal which is applied to diode 4 via a resistor 25 for generating a portion of the first control signal. Also the first control signal of diode 4 has a smaller duty cycle than the information signal I from which it has been derived, which also prolongs the life of this diode.

The repeater has the advantage that the distortion is very small because the repeater can be energized symmetrically. A further advantage is that the prolongation of the life of radiation emitting diodes is realised by simple means, so that an economically attractive proposition is obtained. It is advantageous for any desired inverting operation to be realised without additional means and with only an inconsiderable modification in the lay-out of the p.c. board, namely by interchanging the diodes 4 and 5. The repeater thus obtained is furthermore suitable for high bit rates, because it can be controlled with very short, but relatively high current pulses. The width of the pulse of the first control signal must then satisfy the requirement that it must be possible to switch the trigger circuit without fail.

What is claimed is:
1. A repeater comprising:
    a source of information signals,
    a radiation-emitting element,
    a radiation-sensitive element said radiation sensitive element being electrically isolated from said radiation-emitting element but responsive to radiation emanating from said radiation emitting element,
    first means coupled to said radiation emitting element for generating first control signals for said radiation emitting element from said source of information signals said first control signals having a smaller duty cycle than said information signals, said radiation-sensitive element responsive to said first control signals and generating second control signals which are electrically isolated from said first control signals,
    said repeater further comprises a first input terminal for receiving said information signals, said first means comprises a D-type trigger circuit, an inverter circuit, an exclusive OR-gate, a first and a second AND-gate and a second input terminal for receiving a clock signal,
    said first input terminal is connected to a D-input of said trigger circuit, to a first input of said first AND-gate, to an input of said inverter circuit, and to a first input of said exclusive OR circuit,
    said output of said inverter circuit is connected to a first input of said second AND-gate,
    said second input terminal is connected to the clock input of said trigger circuit, and
    an output of said trigger circuit is connected to a second input of said exclusive OR-gate, and an output of said exclusive OR-gate is connected to a second input of said first and second AND-gates and an output of said first and second AND-gates is coupled to said radiation-emitting element.
2. A repeater for receiving binary information signals at its input and reproducing said information signals as command signals at its output, said repeater comprising:
    radiation emitting means connected to said input;
    radiation sensitive means connected to said output and electrically isolated from said radiation emitting means and from said input for generating said command signals;
    means coupled to said input and to said radiation emitting means for generating first control signals from said information signals;
    said first control signals having a smaller duty cycle than said information signals;
    said radiation emitting means being responsive to said first control signals to emit radiation in response thereto;

said radiation sensitive means being responsive to radiation emitted by said radiation emitting means to produce said command signals at said output; and wherein said means for generating first control signals comprises a D-type trigger circuit and an inverter circuit, an exclusive OR-gate, a first and a second AND-gate, and a second input for receiving a clock signal, and wherein a first input terminal is connected to the D-input of said trigger circuit, to a first input of said first AND-gate, to an input of said inverter circuit, and to a first input of said exclusive OR-gate the output of said inverter circuit is connected to a first input of said second AND-gate, a second input terminal is connected to the clock input of said trigger circuit, an output of said trigger circuit is connected to a second input of said exclusive OR-gate, an output of said exclusive OR-gate is connected to a second input of said first and second AND-gate and an output of said first and second AND-gate is coupled to said radiation emitting means.

* * * * *